Patented Jan. 10, 1933

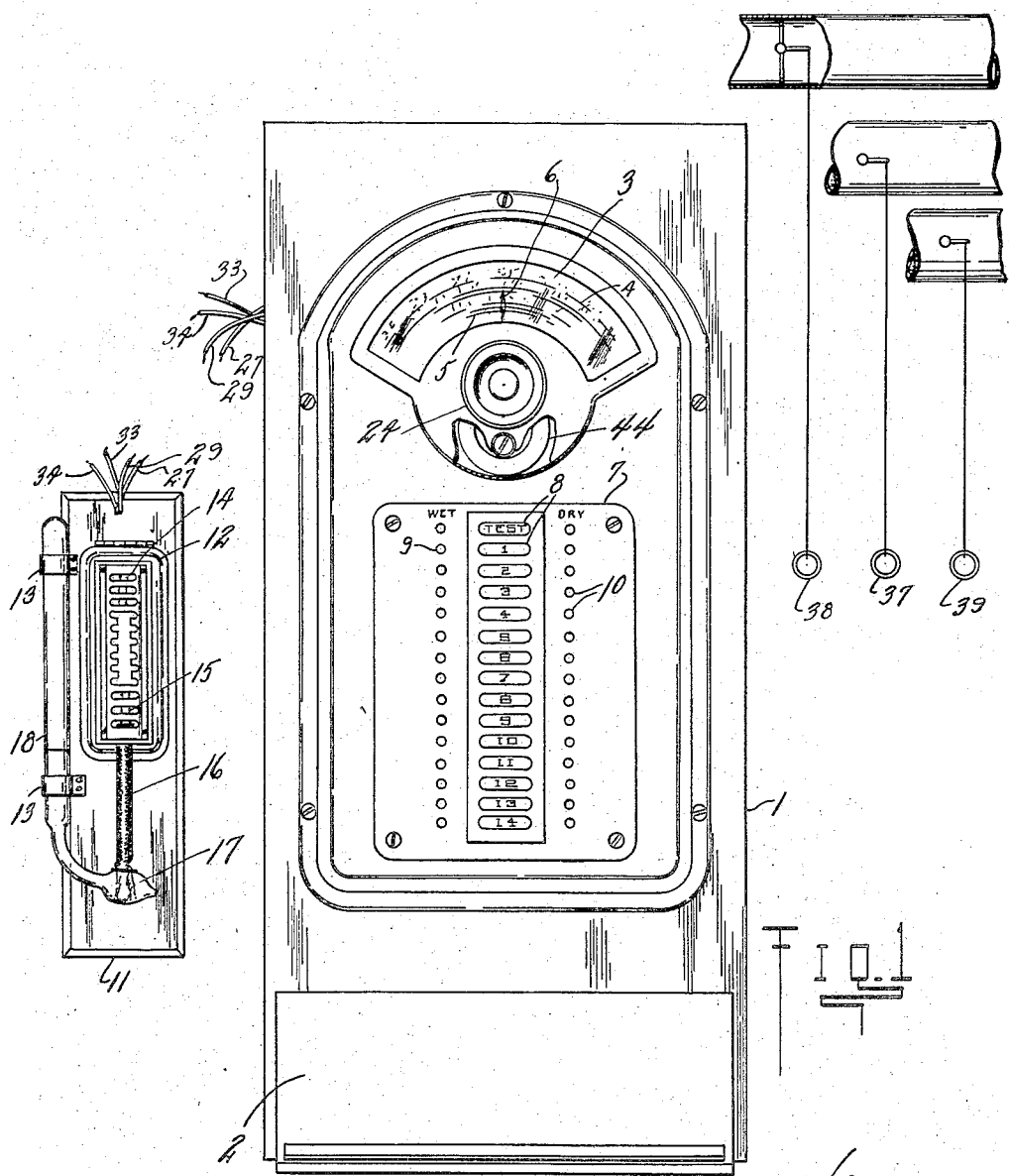

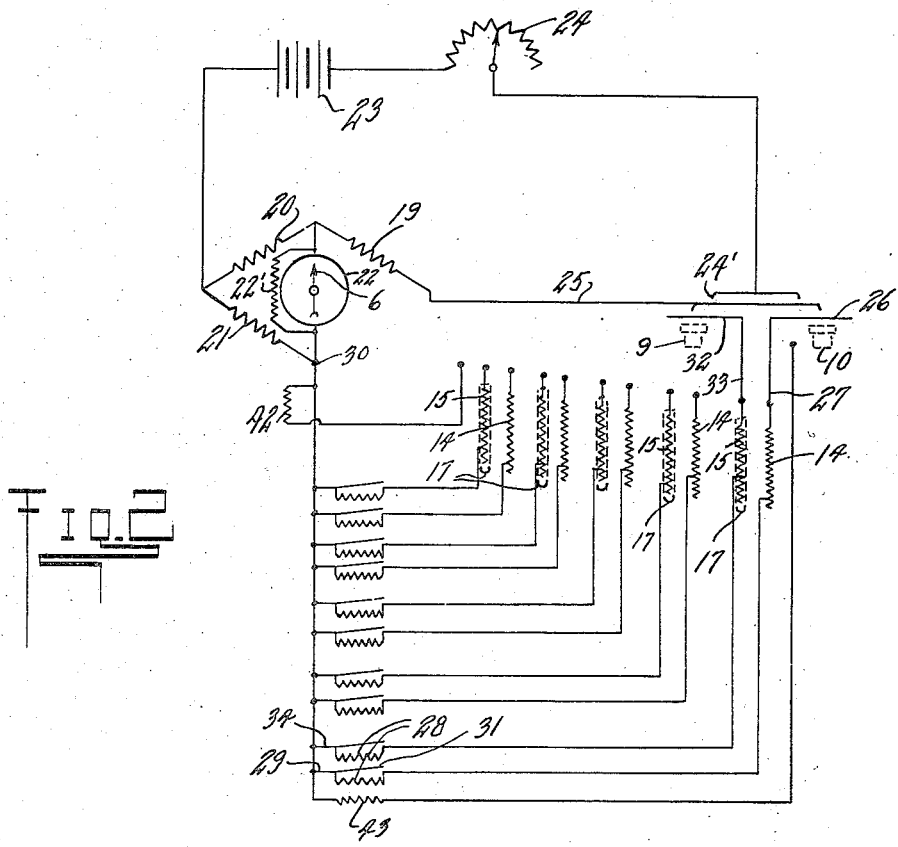
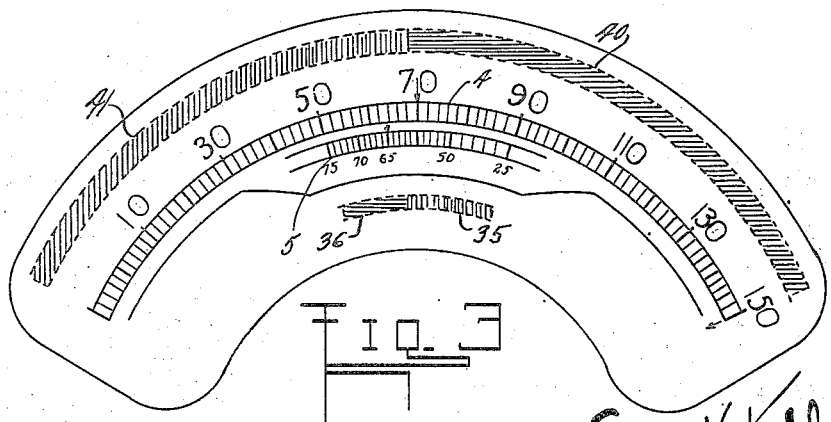

1,894,104

UNITED STATES PATENT OFFICE

CARL H. KUHLMAN, OF TOLEDO, OHIO

HUMIDITY FACTOR TELETHERMOMETER

Application filed March 3, 1928. Serial No. 258,896.

This invention relates to comfort through atmospheric environment incidental to humidity condition, or more generally taking into account humidity factor incidental to temperature.

This invention has utility when incorporated in controlling an indication apparatus involving telethermometer connections with indication interpretation for humidity modification of the temperatures.

Referring to the drawings:

Fig. 1 is a front elevation, with parts broken away, of an indication and control central station with one of the remote humidity and temperature devices;

Fig. 2 is a wiring diagram of features of the indication apparatus of Fig. 1; and Fig. 3 is an enlarged view of the scale as used in Fig. 1.

Housing 1 is shown as provided with desk 2 whereon notations may be readily taken of indications as disclosed by this central station instrument having window 3 with major scale 4 and overlapping secondary scale 5. Indication readings are disclosed by pointer 6 as movable simultaneously over the overlapping portions of the scales 4, 5. Control board 7 is shown as having identification plates 8 with push buttons 9, 10, for the operation of switches for circuits to selected remote places in ascertaining temperature conditions.

In the disclosure herein, at remote places devices are provided embodying frame 11 carrying housing 12 and clips 13. Disposed in the housing 12 is normal temperature resistance 14 and humidity affected resistance 15. This humidity affected resistance 15 is shown enveloped by capillary member or wick 16 extending into bulb 17 charged with water from vessel 18 carried by the clips 13.

The central station instrument, as disclosed, is of a Wheatstone bridge having known resistance legs 19, 20, 21, with galvanometer 22 as an indicating instrument connected between the legs 20, 21, with shunt 22' past said instrument. To the junction between the legs 20, 21, there is connected energy source, as battery 23 and adjustable resistance or rheostat 24. Switch 24' is normally open to be closed by push button 9 or 10 effecting connection with line 25 to the leg resistance 19. Simultaneously with such connection, line or terminal 26 connects by way of line 27 normal or dry temperature indicating resistance 14 through resistance 28 normally in series with the resistance 14 and thence by line 29 to connect with junction 30 between the resistance leg 21 and the galvanometer 22. Switch 31, at the resistance 28, is only emergency closed in special test operations. Assuming the depression of the button 10 shows dry or actual temperature reading for the remote place as selected, then push button 9 may be depressed effective to cut in the battery 23 as well as through terminal 32 and line 33 cut in humidity affected resistance 15 with its resistance 28, thence by line 34 to connect with bus bar line to the junction 30. It is to be understood that for each of the resistances 14, 15, lines 27, 32, respectively extend therefrom for switch control by a push button 10 or 9, all in duplication of the showing in Fig. 2, wherein one instance of such switch connection appears. This remote temperature indicating resistance 15, as having its reading modified by the bulb 17, discloses a drop in temperature as compared with the dry reading from the resistance 14. This is a factor of the humidity condition of the atmosphere bringing about this drop.

In human comfort relations, as well as many industrial processes, the degree of humidity is a factor. In industrial processes, beside temperature, the maintenance of a humidity is essential for reliable operation. When dealing with life or human beings, as assembled in various auditoriums or school houses, the humidity of the enveloping atmosphere is a factor affecting the mental attitude of the people or students, as well as their bodily comfort. The higher the humidity, the lower may be the temperature in the comfort ranges and conversely the lower the humidity the higher the temperature is desired for the same mental acuteness and comfort among the students or people as assembled.

As herein disclosed, the temperature readings are directly taken as to temperature on the major or primary scale 4 as a common scale for both the humidity modified temperature as disclosed by the push button 9 giving a reading for the resistance 15 as well as for indication from the push button 10 giving a reading for the companion resistance 14 as not modified by the humidity. The humidity directly affects a temperature drop relative to the direct reading. In practice, this temperature drop is read and checked with the temperature as to the percentage or relative humidity of the temperature. As herein disclosed, there has been taken into account the departure in temperature as modified by humidity factor in contributing to the mental acuteness and feelings of individuals. This desirable condition for individuals is approximately 68° F. with 45% humidity. As herein effected, a reading of actual temperature on one scale, the scale 4, collaterally discloses a suggested condition for the companion scale. If the resistance 14 of a remote place discloses a temperature of 72° on the scale 4, the indicating needle or pointer 6 simultaneously is in red color region 35 adjacent the scale 5 and its notation indicates that a temperature of 54° might be a proportional reading to be disclosed by the wet bulb thermometer to create the humidity and the suggested conditions of 68° with 45% humidity.

If the push button 9 be depressed and discloses, through the resistance 15, a temperature indication by the needle 6 of 60° on the scale 4, the simultaneous disclosure as in blue portion 36 of the scale 5, is slightly over 67°. This means that the temperature disclosed by the resistance 14 is over four degrees too warm. Accordingly, the operator at the central station 1 may leave humidity control 37 undisturbed, and likewise dry control 38 for such remote place, and reduce the heat delivery to such place by operating control 39. It is thus within the control of the operator at the station 1 to bring about the temperature humidity condition in the selected remote place. The scale 4 has blue association region 40 in the temperature above that desired and red association region 41 in the temperature below that desired as a standard. These color schemes as complementary in position to the color schemes 35, 36, on minor scale 5, may be conveniently suggestive to the operator as to the region of indications. While these test conditions have been suggested for human comfort of adults, the adoption thereof may be varied for invalids, children, special conditions, or industrial conditions.

There is brought within the control of the operator, definite check on atmospheric conditions which have peculiar advantages and possibilities for human comfort, as well as definite carrying forward of industrial processes.

The unknown leg of the Wheatstone bridge between the line 25 and the junction 30 is a region wherein the multiplicity of the resistances for the various remote places are to be brought in one at a time as hereinbefore described. In the checking of this apparatus, resistance 42 may be checked for determining the test point 70° on the scale 4, while fixed resistance 43 may, as adjusted through resistance 24, determine test point 150° on the scale 4. This latter is a remote point from the general run of the readings in practice, while the 70° test is in the vicinity of the usual readings.

The instrument 22 is dead beat against oscillation in the rocking of the needle 6 to locate a reading. While idle the needle is at some point not off the scale end and is thus free for swinging in either direction as a reading may be taken and when recovering at release, there is no impact for disturbing the delicacy of the instrument operation.

Magnet 44 at the instrument 22 is a factor in holding the needle 6 to dead beat operation while the resistance 22' is a contributing factor for quick damping accuracy in the confined region of the more frequent readings.

What is claimed and it is desired to secure by Letters Patent is:—

1. The combination with an indicating instrument of two remote temperature responsive devices, one of which is affected by humidity for departing from the other, control means at said instrument for obtaining disclosure of temperature condition of said devices, connections between the devices and instrument, and humidity factor interpreting indicating means for said disclosure.

2. The combination with an indicating instrument, a wet bulb remote temperature affected resistance, an additional independent remote temperature affected resistance, switch means for disclosing the condition of said resistances, connections between the resistances and instrument, and a compound scale at said indicating instrument including humidity factor interpreting means.

3. A temperature indicating instrument provided with a compound scale having overlapping portions, said overlapping portions comprising a plurality of graduation disclosing scales, one scale being offset a humidity comfort range relatively to a companion scale, indicating means for the compound scale and movable relatively thereto, and connections between the means and instrument.

4. A temperature indicating instrument provided with a common scale, means for disclosing a temperature reading on said scale, means for disclosing a humidity affected reading on said same scale, connections between the means and instrument, and a companion humidity factor interpreting scale.

5. A scale, means for disclosing actual and humidity modified temperature readings on said scale, a companion scale for checking humidity modified readings for suggested temperature, and a control provided with connections therefrom to the means and operable for disclosing readings on the scale.

6. Apparatus for ascertaining humidity factor as modifying temperature, embodying a direct reading instrument provided with normal temperature and humidity modified temperature disclosing scale portions, an additional scale portion for interpreting the humidity modified temperature relatively to the normal temperature, and an indicator in co-operative relation to the scale portions.

7. A telethermometer embodying a Wheatstone bridge, remote temperature and humidity affected resistances in pairs, connections between the resistances and bridge, a scale for taking indications of resistances, and an overlapping humidity factor interpreting scale.

8. A telethermometer embodying a Wheatstone bridge, an energy source extending from one junction of the bridge and provided with a first spring terminal, a variable resistance having a junction connection to the bridge and extending to provide a second spring terminal in proximity to the first spring terminal, an additional different connection from the bridge and extending to provide a third spring terminal intermediate said first and second spring terminals, and a push button spaced from the intermediate terminal by one of the other terminals, said push button being operable against said one to flex said one terminal thereby to move the intermediate terminal to act on the remaining terminal for closing said three terminals.

9. A telethermometer embodying a Wheatstone bridge, an energy source extending from one junction of the bridge to provide a pair of spring terminals, a pair of variable resistances for a junction connection to the bridge and respectively as extending to provide a second pair of spring terminals in proximity to the first pair of spring terminals, additional different connections from the bridge and extending to provide a third pair of spring terminals intermediate said first and second pair of spring terminals, and a pair of independently operable push buttons, each spaced from the intermediate terminal by one of the other terminals, said push buttons being selectively operable for closing such one terminal with its intermediate terminal by flexing still further to effect engagement with a remaining adjacent terminal for effecting a three terminal switch closing operation.

10. A telethermometer embodying a Wheatstone bridge, an energy source extending from one junction of the bridge to provide a first pair of spring terminals, temperature responsive variable resistance means in pairs at remote places, one being dry and the other humidity responsive, and having junction connection to the bridge and extending to a second pair of spring terminals in proximity to the first pair of spring terminals, additional different connections from the bridge to provide a third pair of spring terminals intermediate the first and second pair of spring terminals, and push buttons selectively operable and by single movement effective for one push button to close three of the terminals of the two sets of three each, one of said closed terminals being effective for disclosing a humidity responsive condition and another for disclosing a dry temperature responsive condition.

11. A telethermometer embodying a Wheatstone bridge including a galvanometer provided with a movable indicator to be operated by electric current means from the bridge, a housing for the galvanometer, and a graduation carrying scale, said galvanometer including, apart from its indicator operating means from the bridge, a permanent magnet in the housing opposite the scale provided with mounting means rendering magnetic flux effective to render sluggish the indicator actuation.

12. A telethermometer embodying a Wheatstone bridge including a galvanometer provided with a movable indicator to be operated by electric current means from the bridge, a housing for the galvanometer, a graduation carrying scale, said galvanometer including, apart from its indicator operating means from the bridge, magnetic flux providing means in the housing opposite the scale reacting to render sluggish the indicator actuation, and a shunt resistance for further minimizing oscillation of the indicator.

In witness whereof I affix my signature.

CARL H. KUHLMAN.